Sept. 8, 1959         A. POLANSKÝ ET AL         2,903,186
                    HYDROMECHANICAL MODEL
Filed May 31, 1957                              5 Sheets-Sheet 5
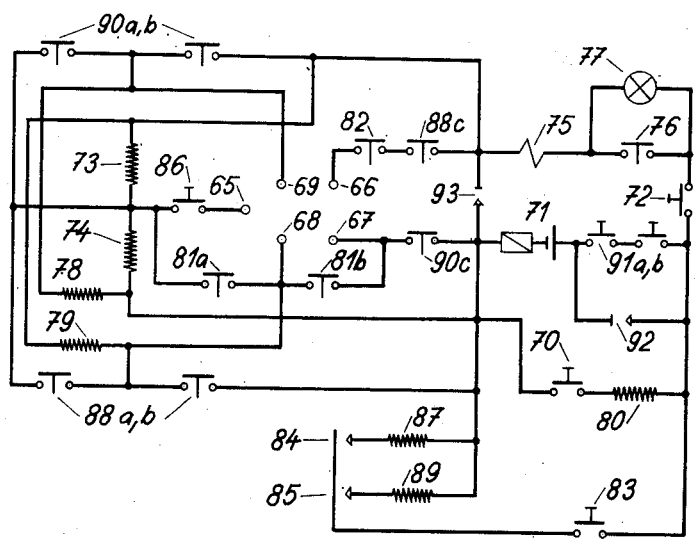
AUXILIARY CIRCUIT
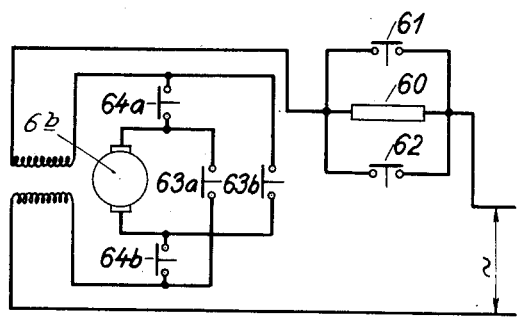
MOTOR OPERATING CIRCUIT
FIG. 6
INVENTORS
Alois Polanský, Mirko Hrubý
BY
Richard Ernst
Ag't United States Patent Office 2,903,186
Patented Sept. 8, 1959

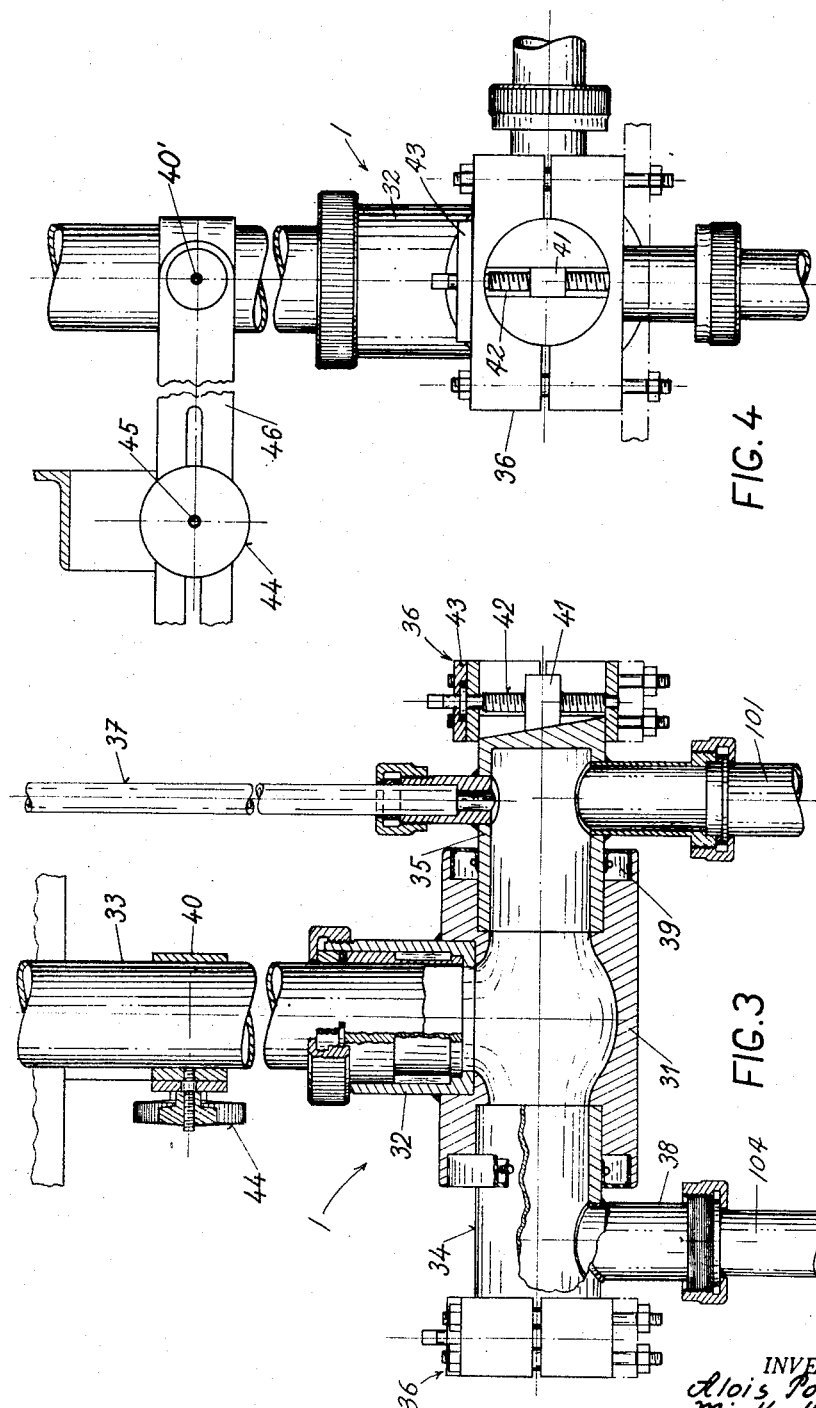

2,903,186

HYDROMECHANICAL MODEL

Alois Polanský, Prague, and Mirko Hrubý, Brno, Czechoslovakia

Application May 31, 1957, Serial No. 662,905

Claims priority, application Czechoslovakia June 15, 1956

19 Claims. (Cl. 235—184)

The present invention relates to a hydromechanical model of a thermal field, by means of which it is possible to solve the problems of unstable or non-stationary processes of heat transfer in walls in a relatively simple and easily comprehensible way on the basis of analogy between the flow of heat and hydraulic phenomena.

The wall under examination may be imagined as being divided into $n$ equal parts. It may be imagined that the thermal capacity of the individual parts of the wall is displaced into the axis of each part, the thermal capacity of each part being represented in the model by a capacity tube with a certain free surface of liquid. The thermal resistance of each of the individual parts of the wall is represented in the model by a resistance element, by means of which any desired resistance against the flow of liquid may be continuously adjusted within wide ranges. When solving problems by means of a model, the heights of liquid columns in the capacity tubes correspond to the temperatures in the various layers of the walls.

The boundary temperature conditions between the inner and outer media may be adjusted on the model as required by means of overflow vessels, which are placed at the inlet and exit sides of the model.

On the basis of an established analogy between reality and the model it is then possible to transform any required cases of a unidimensional unstable (non-stationary) flow of heat according to known physical values so as to allow solution by means of a model and the results may then be transferred back into reality by a suitable calculation. A process of any duration may be shortened to a reasonable period by a suitable time-reduction.

In known similar models working on the basis of hydraulic analogy, tubes of a given diameter and length are used as resistance elements, said tubes showing a predetermined hydraulic resistance. A change of resistance is carried out either by a change of the tubes or by inserting different cylindrical inlays.

A drawback of this method is the impossibility of adjusting to a required resistance during the measurement and the difficult manipulation required for exchanging the resistance elements, which, apart from an insufficient accuracy, extends the time necessary for the measuring operation. The thermal capacity of the individual elementary parts of the wall is replaced by capacity tubes of different cross sections. Each change of capacity necessitates a change of tubes. When changing the resistance or capacity a continuous variation of the adjustment cannot be effected. A further disadvantage of these models is the fact that it is difficult to store the considerable quantity of capillaries and tubes required for adjusting the resistances.

The present invention avoids the above disadvantages of the existing devices by providing a hydromechanical model which ensures a continuous regulation of the hydraulic resistance by means of resistance control members, so as to permit instantaneous changes of the hydraulic resistances to required values during the measurement and without any interruption of the operation, such values corresponding to physical values of an actually effected process.

The hydromechanical model according to the invention comprises resistance control members connected in series and capacity tubes mounted in rotatable joints adapted for the passage of a working liquid of a required viscosity from overflow vessels, which represent parts of the boundary conditions of the model and enable a predetermined adjustment of the levels in the overflow vessel according to a given temperature program derived from templates by means of electric pick-ups. It is an advantage of the hydromechanical model according to the invention that, by means of one resistance control member, a hydraulic resistance may be adjusted within a very wide range. Transformer oil is used as the working liquid in this model instead of water in order to ensure laminary flow in the control member, this being a basic prerequisite for a hydraulic analogy.

A further advantageous feature of the hydromechanical model according to the invention is a new design of the joint supporting each capacity tube to permit limited or partial tilting movement of the latter. Such tilting, combined with insertion of inlays in the capacity tubes, permits a continuous change of the thermal capacity of various elementary parts to be carried out within a wide range. The continuous change of capacity is made possible by suitable dimensioning of the series of inlays, so that the tube, in its maximum tilted condition with an inlay therein, offers the same surface of the free level as the tube in a vertical position with the next smaller inlay of the series therein. A continuous change of capacity within a range from 7 to 100% can be achieved with only twelve cylindrical inlays.

In order to secure the adjustment of boundary conditions the hydromechanical model embodying the invention is equipped at both sides with overflow vessels, and the height of each overflow vessel is automatically adjustable in dependence on the predetermined course of temperature. For the purpose of following the temperature course a template pick-up system is used.

In accordance with the invention an electric pick-up apparatus has a pick-up pin following the shape of the template by means of a guiding rod and lever mechanism and adapted to close auxiliary contacts on a switchboard, so as to close various circuits of a relay system, which serve for controlling the driving electric motors. The vertical displacement of the overflow vessels has a definite relation to the movement of the pick-up means. The velocity of the movement of carriages supporting the templates may be changed by a gear box e.g. a three-speed gear box.

The accompanying drawings represent an example of a hydromechanical model according to the present invention.

Fig. 3 is a fragmentary longitudinal section of a joint of a capacity tube which is included in the model of Fig. 1;

Fig. 4 is a side view of the joint of Fig. 3,

Fig. 6 is the wiring diagram thereof.

Figure 1:
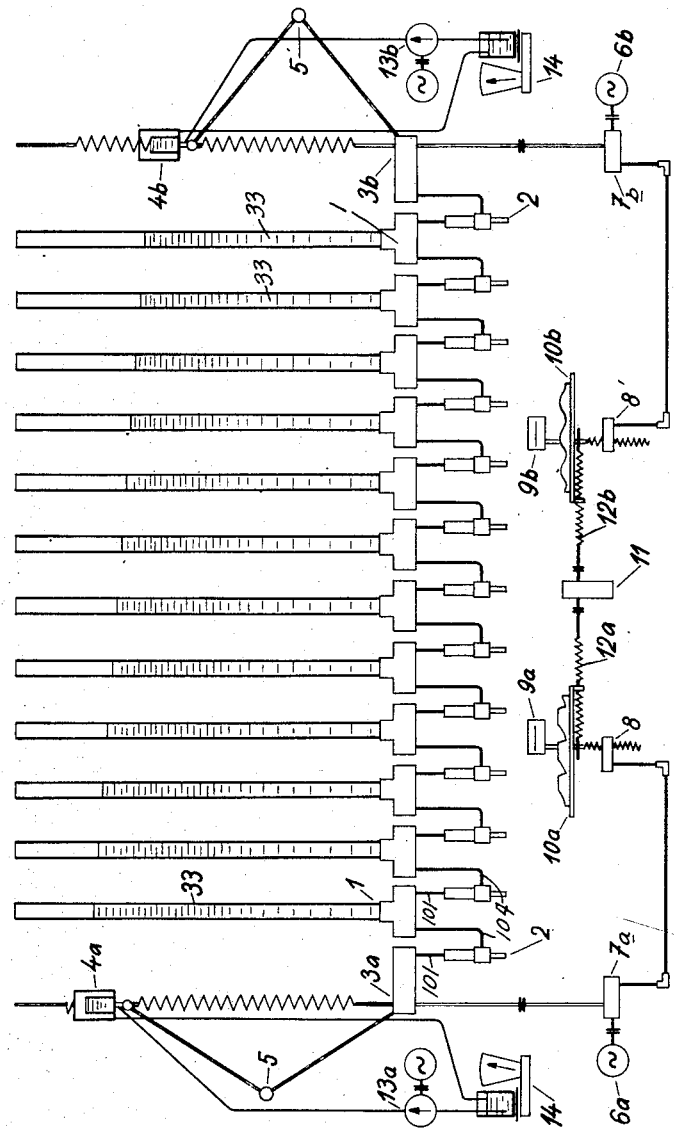
Fig. 1 is a diagrammatic representation of a hydromechanical model embodying the invention.

The overall arrangement of the hydromechanical model is apparent from Fig. 1. Mounted on a table structure, which is preferably welded and consists of two parts, is a frame with capacity joints 1 provided with capacity tubes 33. Welded or secured in any other way to the front part of the table is a longitudinal rod (not shown) to which resistance control members 2 are secured by means of suitable yokes. The capacity joints 1 are connected with the control members 2 by means of suitable tubes which are preferably made of plastics. The first control member 2 is connected to an inlet attachment joint 3a and the last control member 2 is connected with an outlet attachment joint 3b. Each of the attachment joints 3a and 3b is provided with a closing valve by means of which the supply of working liquid from the overflow vessels 4a and 4b into the system of the model may be interrupted.

The overflow vessels 4a and 4b, connecting joints with connecting tubes and the attachment joints 3a and 3b with the closing valves represent the so-called "boundary conditions," which are placed in towers at each end of the table.

The "boundary condition" at the entry side is represented by the overflow vessel 4a, a connecting joint 5 and the attachment joint 3a. The "boundary condition" at the exit side is represented by the overflow vessel 4b, a connecting joint 5 and the attachment joint 3b. The described arrangement ensures a continuous change of levels in the overflow vessels and a constant volume of the enclosed liquid as well as a constant resistance during its flow through the system of the "boundary conditions" during the displacement of the overflow vessels.

The vertical movements of the overflow vessels 4a and 4b are effected by electric motors 6a, 6b with gear boxes 7b each having two drives. One of these drives is attached to a transport screw for the related overflow vessel and the other drive of each gear box is connected by two bevel gears with a transport nut 8 or 8' for the lower bearing of an electric pick-up.

The electric pick-ups 9a and 9b render possible the adjustment of levels in the overflow vessels 4a and 4b according to a predetermined course by closing various electric circuits.

Means comprising members travelling along templates or cams 10a and 10b are used for following a predetermined temperature course. The templates 10a and 10b are secured to carriages and driven by transport screws, 12a and 12b which are driven from a three-stage gear box 11.

The gear box 11 provides for three different speeds of movement of each carriage on the path defined by the transport screw 12a or 12b. The speeds of movement of the templates 10a or 10b i.e. at the entry and exit-side, are equal, but the pick-ups 9a and 9b operate independently from each other.

The model of Fig. 1 also includes pumps 13a, 13b for the boundary conditions, which discharge the working liquid into the overflow vessels at the entry and exit-sides, and which operate independently of each other.

The vessels with the working liquid are mounted on scales 14 so as to render possible the measurement or checking of the amount of liquid.

Figure 2:
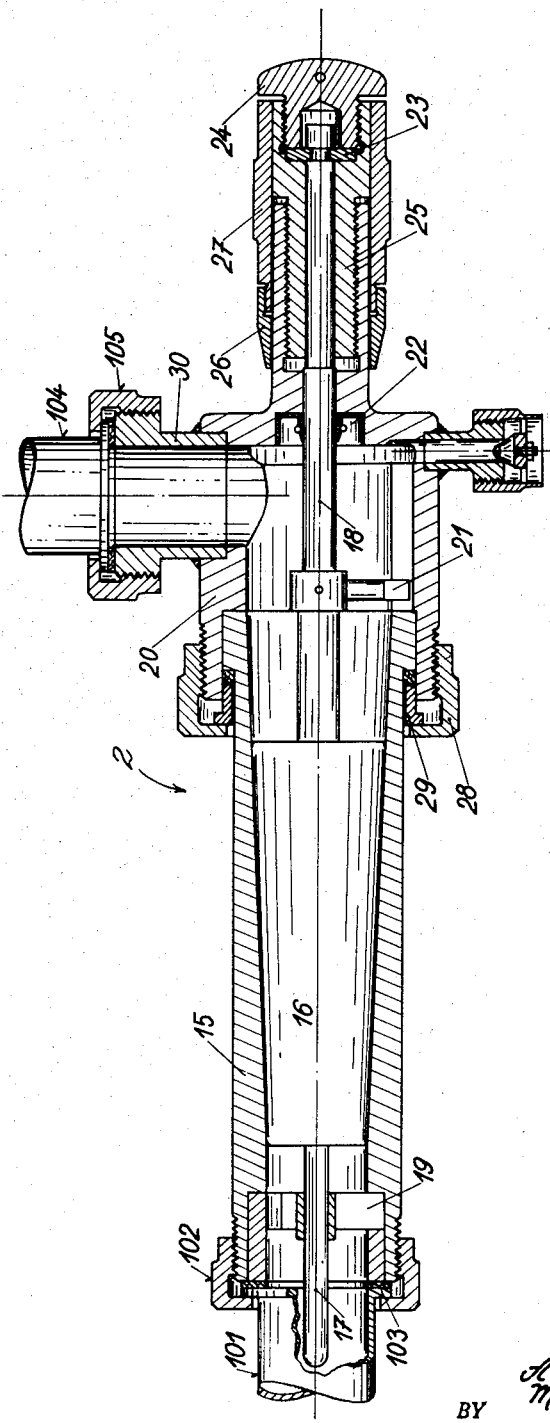
Fig. 2 is a sectional view of a resistance control member used with the model of Fig. 1.

Each resistance control member 2, shown in detail in Fig. 2, provides for a continuous change of the hydraulic resistance while ensuring a laminar flow of the liquid. Moreover, this member ensures equal results of measurement, so that for a certain adjustment of the member there correspond always the same values of hydraulic resistances.

Each main component part of the resistance control member 2 is a pin in a housing. The pin comprises a conical portion 16, a front spindle 17 and a rear guiding spindle 18. The housing includes a conical casing 15, and at the entry side of the latter, the spindle 17 of the conical pin is guided in a sleeve 19 and at the exist side of the casing 15, the spindle 18 is guided in the body of a member 20. The pin is secured against rotation by an arm 21 extending radially from spindle 18 and engaging a groove in the body of the member 20. The spindle 18 is sealed at the exit side by a suitable seal 22, preferably of a type known as "Guffero-seal" mounted in an annular recess in the body of the member 20.

The spindle 18 is connected for rotation with a fine pitch transport screw 25 by means of a washer 23, consisting of two parts, and a screw nut 24. The screw 25 protruding into an extended part of the body of the member 20 serves to impart sliding movement to the conical pin 16.

The adjustment may be checked by means of a micrometric scale engraved on a ring 26, which is fitted on a sleeve 27, rigidly connected with the transport screw 25. When adjusting the apparatus the actual (zero) position of the pin 16 in the casing 15 is first determined and this position is fixed by a corresponding movement and rigid connection of the ring 26 to the sleeve 27.

The member 20 is attached to an external flange on the exit end of the casing 15 by means of a sleeve nut 28, and a suitable seal is held in position by a ring 29 against which the nut 28 acts.

At the entry side of the resistance control member a connection is established between the supply conduit and the resistance control member e.g. by a tubular piece 101 with a sleeve nut 102 and a sealing ring 103 is tightened between the casing 15 and the tubular piece 101.

At the exit side of casing 15 a tubular piece 30 is secured to the body of the member 20. The connection of the exit side of the member 20 with a conduit 104 is established by means of the tubular piece 30 which is secured by a sleeve nut 105 to the conduit 104 with a suitable seal being provided in the connection.

The main component part of the device for effecting the continuous change of capacity is the joint 1, shown in detail in Fig. 3, which connects the capacity tube 33 with the supply and discharge conduit for the working liquid of the hydromechanical model of a thermal field. The capacity tube makes possible a continuous change of capacity from a predetermined minimum to a maximum.

This continuous change of capacity is achieved within a partial range by tilting movement of the capacity tubes 33 so as to continuously change the area of the free level of the working liquid in the tubes and the maximum and minimum values of this partial range are changed by inserting cylindrical inlays of predetermined diameters, so as to change the free level of the working liquid intermittently or in steps.

As shown in Figs. 3 and 4, the joint 1 of each capacity tube consists of a cylindrical body 31 with a head 32, housing the capacity tube 33. Inserted into the opposite ends of cylindrical body 31 are two hollow pivots 34, 35 which are clamped in bearings 36, each consisting of two parts. The pivot 35 carries a level gauge 37 and the pivots 34 and 35 are both provided with tubular pieces 38 attached by means of the conduits 104 and 101, respectively, to the resistance control members 2.

The pivots are sealed in the body 31 of the joint by suitable seals 39, which are preferably of the kind known as "Guffero-seals." The capacity tube 33 carries a sleeve 40 provided with a stabilising screw 40. The pivots 34, 35 are secured against rotation and pressed against the body 31 by means of wedges 41; having screws 42 passing therethrough and mounted in the upper and lower parts of bearings 36. The screws 42 are secured against movement relative to bearings 36 in the axial direction by securing plates 43. The lower and upper parts of the bearings with the securing plates are fixed by means of screws to the table of the model.

The pivots 34 and 35 of the joints are pressed axially towards each other by tightening the wedges 41.

The capacity tubes 33 may be tilted through a desired angle from their vertical position in the following way: A nut 44 on a screw 45 which is rigidly secured to the frame of the model is loosened. The screw 45 passes freely through a slot in a link 46 which is provided with a scale and which is pivotally connected to the sleeve 40. The link 46 being thus set free, the tubes may be tilted to the required position and secured by tightening the nut 44 again.

Figure 5:
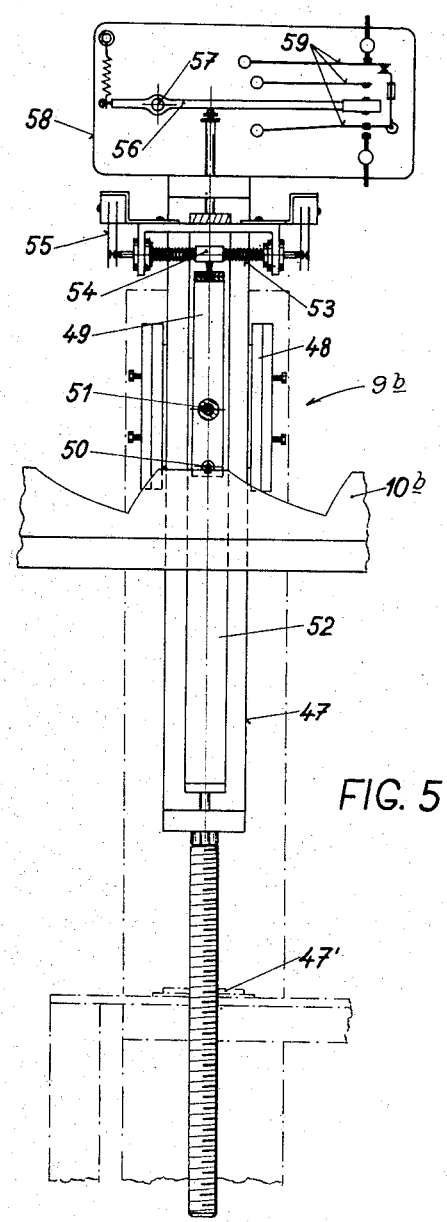
Fig. 5 shows the electric pick-up member of the model of Fig. 1.

The electric pick-ups 9a and 9b have the construction shown in Fig. 5 fulfill the requirement of a continuous and accurate change of the levels of the working liquid in the overflow vessels 4a and 4b for the boundary conditions in dependence on the required temperature program.

Each electrical pick-up according to the invention comprises a carrying rod 47, provided with a transport screw engaging a nut 47'. By rotating the nut 47' the carrying rod is displaced in the axial direction in a guide 48. A contact fork 49 provided with a pick-up pin 50 is mounted for rocking movement on a pivot 51 secured to a carrying fork 52 adapted for axial movement in the carrying rod 47.

The contact fork 49 operates as a two-armed lever, and is maintained in its neutral position by helical springs 53. A dog 54 engaging with the fork 49 serves for transmitting the rocking movement of the fork to so-called safety contacts 55 i.e. contacts which, when closed, are adapted to cause quick movement in upward direction. The closing of the safety contacts is effected when the fork 49 swings in either direction and its purpose is to prevent the pick-up pin 50 from being deformed, if jamming of the template should occur. The resistance against closing of the safety contacts 55 is controlled by the rigidity of the springs 53.

Each template 10a and 10b secured on a carriage, as shown in Fig. 1, is movable below the pick-up pin 50 of the related pick-up 9a or 9b, so that the pin 50 follows the cam surface of the template and, depending upon the inclination of the cam surface, either sinks together with the fork 49 by reason of the weight of these components, or is biased upwards. A cylindrical portion of the carrying fork 52 transmits movement to a contact lever 56 which is mounted for rotation on the pivot 57, secured to a panel 58. The ratio of arms of the contact lever 56 is relatively large, in order to achieve a suitable sensitivity of the pick-up. The contact lever 56 is provided with contacts cooperating with a system of fine flat springs 59 carrying contacts, and which are also mounted on the panel 58. By closing the contacts according to a certain pattern, the operative circuit of the related main electric motor 6a or 6b may be controlled through a relay system. Each main electric motor is of the commutator type, which is reversible and has a variable speed in either direction of rotation. Further, each of the motors 6a and 6b is connected to a common gear-box 7a or 7b which drives the transport screw of the overflow vessel 4a or 4b and the lower bearing 8 or 8' of the related pick-up formed by the nut 47'. The displacement of each of the overflow vessels 4a, 4b is effected in a predetermined ratio with respect to the displacement of the related pick-up 9a, 9b.

In order to explain the operation of the pick-up 9a or 9b according to the invention, it is assumed that a slightly upwardly inclined section of the template 10b is in engagement with the pick-up pin 50, for moving the latter upwards. The contact-lever 56 closes the respective contacts, the main motor 6b is operated and the overflow vessel 4b is moved upwardly along with the pick-up. Such upward movement of the pick-up releases the pressure of the template 10b against the pick-up pin 50 so that the contact lever 56 opens the contacts 59 for upward movement and the motor 6b comes to a standstill.

When a downwardly inclined section of the template is in engagement with the pick-up pin 50, a reversed sequence of operations takes place.

If, however, a steeply inclined section of the template engages the pick-up pin 50, so that the danger of a possible deformation of the pick-up pin is imminent, the lateral pressure caused by the movement of the template exceeds the pressure of the spring 53, and the contact fork 49 is deflected from its neutral position causing the safety contacts 55 to be closed, with the result that the circuit for a quick upward movement is established. This state lasts until the excessive lateral pressure of the template against the pick-up pin 50 is relieved.

The electric circuits, shown in Fig. 6, effect the automatic adjustment of the boundary conditions according to a program having a predetermined time-temperature change. In the diagram of the auxiliary circuit appearing at the top of Fig. 6, the connections for the pick-up contacts of the pick-up 9a or 9b are shown. According to the various connections of the pick-up contacts the working circuit (appearing in the lower portion of Fig. 6) of the related electric motor may be controlled to displace the overflow vessel for the boundary conditions in upward or downward direction.

In order to permit change of both the direction of rotation and the speed of the motor a single phase commutator series electric motor has been used in the illustrated embodiment. A change of the direction of rotation is achieved by reversing the connections of the collector brushes. The operative or working circuit for the motor 6a or 6b is fed e.g. from 220 v. A.C. supply lines. A resistance 60 is interposed in the supply line to the motor for reducting the speed of the latter. The resistance 60 may be eliminated or short-circuited by closing the switch 61 or 62. The change of the direction of rotation is achieved by closing the switches 63a and 63b or 64a and 64b. When all of switches 63a, 63b, 64a and 64b are open, the motor is at a standstill. The switches of the operative or working circuit are controlled by exciting the coils of respective relays of the auxiliary circuit.

The pick-up contacts, which are generally indicated at 59 on Fig. 5, are connected in the auxiliary circuit appearing at the top of Fig. 6 and are there identified by the reference numerals 65, 66, 67, 68, 69 and 70. The auxiliary circuit is supplied over a fuse 71 and main switch 72 from a source of direct current e.g. of 24 v. During operation of the auxiliary circuit, the current passes from the source of direct current through the coils of relays 73, 74 by way of the coil of an auxiliary sparking relay 75 and its normally closed contact 76. Connected in parallel with the contact 76 is a bulb 77. When a short circuit is established, the relay 75 is excited so that the contact 76 is opened and current passes exclusively through the bulb 77, which lights up. The armature of relay 73 is connected to switches 63a and 63b to close the latter upon energization of relay 73 while the armature of relay 74 is connected to switches 64a and 64b to close the latter when relay 74 is energized.

In the operation of the pick-up contacts the following connections may be established:

65—66 slow movement downward
65—66—69 quick movement downwards
65—66—67 stop
65—67 slow movement upwards
65—67—68 quick movement upwards By closing the contacts 65—66 the coil of the relay 74 is excited so that the switches 64a and 64b in the operative circuit are closed, while the resistance 60 remains connected in the circuit. Therefore, slow movement in the downward direction takes place. By closing the contacts 65—66—67 the coil 74 remains excited and the coil of the relay 78 is also excited. Relay 78 has its armature connected to switch 61 so that, upon energization of relay 76, switch 61 is closed for eliminating the resistance 60. The motor then receives the full voltage and its operation is accelerated. By closing the contacts 65—66—67 a direct short circuit is established, with practically no current flowing through the coils of the relays 73 and 74, with the result that the switches 63a, 63b, 64a and 64b are opened and the motor is stopped.

When the contacts 65—67 are closed, the relay 73 is excited, so that the switches 63a, 63b are closed and the motor runs in the opposite direction to that in the previous example. When the contacts 65—67—68 are are closed, the relay 79, which has its armature connected to switch 62, is energized and thereby causes the resistance 60 to be eliminated so as to accelerate the operation of the motor. When the safety switch 70 is closed, which takes place when a steep portion of the template comes into engagement with the pin 50, the coil of the relay 80 is excited. By attracting its armature, the relay 80 closes the switches 81a, 81b with the result that the coils of the relays 75 and 79 are excited and the switch 82 is opened. Quick movement in upward direction takes place so as to prevent a dangerous jamming of the template.

In order to permit manual control of each of the motors 6a and 6b, the auxiliary circuit for each motor includes switches 83, 84 and 85. By closing the main switch 83 of the manual control circuit, the main switch 86 of the automatic control circuit is opened at the same time, provided that a template is not inserted on the carriage. The switching-off of the automatic control circuit is thus achieved with simultaneous closing of the hand control circuit. The coil of a relay 87 is then excited by means of the switch 84, the relay 87 closing contacts 88a and 88b and opening contact 88c. During this state of the connection current flows mainly through the winding of the relays 75 and 79 which causes quick movement in upward direction.

When the switch 85 is closed, a relay 89 closes contacts 90a, 90b and opens a contact 90c, so that the coils of the relays 74 and 78 are excited causing quick downward movement. In order to limit the maximum and minimum displacement of the overflow vessels 4a and 4b for the boundary conditions, terminal abutment or limit switches 91a and 91b are mounted at the lower and upper ends, respectively, of the path of each vessel. When the overflow vessel abuts against either of these limit switches, the latter is opened and thereby interrupts the auxiliary circuit. Renewed closing is effected by a hand-switch 92, by means of which the opened switch 91a or 91b is bridged. For instantaneous stopping of the motor a manually operated switch 93 is used, and the bulb 77 lights up when this switch is closed. It is thus possible to use the switch 93 both for checking the supply of current and for complete switching off of the relays 73 and 74.

In order that the invention may clearly be understood, a practical example of a measuring operation by means of the apparatus will now be described:

A two-layer panel traverses a tunnel with the temperature of the medium flowing therethrough being varied. The task is to ascertain the course of temperatures in the entire cross section of the panel in relation to time and the amount of heat passing into the panel through each surface thereof.

In order to solve this problem the following values must be known:

(1) The structure of the panel, i.e. the thickness of various layers.

(2) The physical values of the materials used, namely:

weight per unit (kg./m.$^3$).
thermal conductivity (kcal./mh.°C.).
specific heat (kcal./kg.°C.).

(3) The course of the boundary conditions, i.e. the course of temperatures of the medium at each side of the panel in relation to time.

(4) The coefficient of heat transmission from the medium into the panel at each side of the latter.

(5) The time range of the test and the temperature range.

With these values on hand, the adjustment of the apparatus is calculated as follows:

(1) A suitable time and thermal constant is chosen with respect to the assumed ranges.

(2) The examined wall is assumed to be divided into 12 layers and the thermal capacity of these layers per 1 m.$^2$ of area determined. The size of the inlay in each capacity tube 33 and the deflection or tilting of the capacity tube are determined, so as to make the free level correspond to the thermal capacity of the corresponding layer.

(3) The thermal resistance between the center lines of the individual layers is calculated and, by means of diagrams, the resistance elements 2 are adjusted for a given oil temperature.

(4) The conversion constant for the amount of heat is determined.

(5) If automatic adjustment of the boundary conditions 10a and 10b are used, the shapes of the templates are determined with respect to the selected time constant.

The measuring operation itself proceeds as follows:

(1) In accordance with the calculated adjustment the capacity tubes 33 are provided with corresponding inlays and tilted to the required angle and the resistance control members 2 adjusted by means of the micrometer screws 25.

(2) The templates 10a and 10b are secured to the template carriages.

(3) The vessels 4a and 4b are adjusted to the initial values.

(4) The pumps 13a and 13b are set in operation.

When the initial level of oil in all tubes 33 has been reached the measuring operation itself may start i.e. the driving mechanism 11 for the movement of the templates is started, the values on the scales 14 as well as the heights of levels in all capacity tubes are read.

During the measurement the values on the scales 14 and the heights of the oil columns in the individual capacity tubes 33 are read at predetermined intervals. All values are suitably recorded.

After the measurement has been finished the numerical and graphical evaluation of the obtained results takes place, which is carried out by mpeans of conversion coefficients for time, temperature and amount of heat.

The results obtained are represented by curves of the temperature field in the individual time intervals and curves of the amount of heat which has passed into the panel through both its surfaces.

When solving the problems of a nonstationary or unstable flow of heat in a unidimensional system by means of the hydromechanical model according to the invention, knowledge of the basic physical properties of the materials used is indispensable. On the basis of the hydraulic analogy between reality and the model, the above mentioned physical values are transformed by calculation to the respective hydraulic resistance and capacity of the various elementary components. After setting the resistance control members 2 and capacity tubes 33 to the required values, the experiment itself may be carried out, taking as the basis therefor either a stabilised state of the temperature course or a pseudo-stationary state of a temperature oscillation.

In accordance with the required temperature changes the adjustment of the boundary conditions is carried out by suitable vertical movements of the vessels 4a and 4b. In addition to the predetermined temperature changes the model according to the invention may preferably be used also for the solution of problems of adiabatic cooling by closing the valve 3a or 3b leading to the vessel 4a or 4b, representing the respective boundary condition.

During the experiment, not only the changes of levels in the capacity tubes, but also the changes in the quantity of the working liquid may be ascertained on the scales 14. The evaluation of the measurement results is carried out by determining the temperature field as well as the flow of heat in the examined structure by means of hydraulic analogy, and transferring the result of the solution on the model back to reality. The hydromechanical model according to the invention makes possible the solution of Fourier's partial differential equation of heat convection in a differential way.

The main advantage of the hydromechanical model according to the invention is the use of resistance control members 2 within a wide range of measurements and the continuous capacity changes, achieved on the one hand by tilting the capacity tubes 33 and on the other hand by insertion of cylindrical inlays in the tubes. This continuous change not only of the hydraulic resistance, but also of the capacity enables a change of the physical values of the tested body to be carried out in accordance with the actual process taking place in reality (e.g. change of moisture in brick-work) during the experiment. In addition to this any desired dependence of the thermal capacity on temperature may be achieved by using profiled inlays in the capacity tubes.

The hydromechanical model according to the invention may be used not only for solving the problems of non-stationary thermal fields in walls of any desired composition, but also in all fields where heat is present as a component of a process, such as, for example, in the acceleration of hardening of concrete and other calcium silicates by steam, cementing during frost, cooling processes in dams, building of furnaces, boilers, regenerators and drying plants, some cases of insulation, heat treatment and refining of metals, cooling of ingots, castings and the like.

By comparing different methods for the solution of problems of non-stationary phenomena connected with heat transfer it has been found, that the solution by means of a model is simpler, quicker and easier to comprehend than other methods, while yielding fully accurate results. A further advantage obtained by the use of a model resides in the fact that it is suitable also for the solution of more complex cases, in which the mathematic, graphic or numerical solution is very difficult and often impossible.

When solving problems connected with a non-stationary heat transmission through walls consisting of several layers (e.g. prefabricated panels) the hydromechanical model has to be extended to comprise a greater number of members, in order to achieve sufficient accuracy of the results of the measurements.

We claim:

1. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a system of capacity tubes adapted to be filled to a predetermined height with the said liquid, rotatable joints for mounting the capacity tubes for angular adjustment, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the adjusting means.

2. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a conical casing in each of the resistance control members, a conical pin mounted for axial displacement in the conical casing, a micrometric screw engaging the conical pin to allow exact adjustment of the latter with respect to the conical casing to form a passage for the liquid and to provide for a continuous change of hydraulic resistance by axial displacement of the conical pin in the casing and to maintain a laminar flow of the working liquid, a system of capacity tubes adapted to be filled to a predetermined height with the said liquid, rotatable joints for mounting the capacity tubes for angular adjustment, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the adjusting means.

3. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a system of capacity tubes adapted to be filled to a predetermined height with the said liquid, rotatable joints for mounting the capacity tubes for angular adjustment, a system of inlays adapted to be selectively inserted into any of the capacity tubes to provide in combination with the angular adjustment of the capacity tubes a continuous adjustment of the capacity within a predetermined range of measurements, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the adjusting means.

4. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a system of capacity tubes adapted to be filled to a predetermined height with the said liquid, rotatable joints for mounting the capacity tubes for angular adjustment, a joint for mounting the capacity tubes, two hollow pivots secured to the frame of the model, hydraulically connected to the resistance control members and cooperating with the said joint of the capacity tubes to allow angular adjustment of the latter, bevelled edges provided on the hollow pivots and adjustable wedges adapted to engage the bevelled edges for securing the hollow pivots to the frame of the model and for tightening the hollow pivots against the said joints, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the adjusting means.

5. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a system of capacity tubes adapted to be filled to a predetermined height with the said liquid, rotatable joints for mounting the capacity tubes for angular adjustment, a joint for mounting the capacity tubes, two hollow pivots secured to the frame of the model, hydraulically connected to the resistance control members and cooperating with the said joint of the capacity tubes to allow angular adjustment of the latter, bevelled edges provided on the hollow pivots and adjustable wedges adapted to engage the bevelled edges for securing the hollow pivots to the frame of the model and for tightening the hollow pivots against the said joints level gage tubes connected to the said joint so as to allow simultaneous tilting of the level gage tubes with the capacity tubes, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the adjusting means.

6. A hydromechanical model as claimed in claim 5, wherein the level gage tubes are mounted in the hollow pivots to remain in vertical position when the capacity tubes are tilted.

7. A hydromechanical model as claimed in claim 1, wherein the overflow vessels representing the boundary conditions are connected by joint attachments to marginal resistance control members to secure a constant volume of the enclosed liquid, while maintaining the same hydraulic resistance.

8. A hydromechanical model of a thermal field for the solution of non-stationary processes of heat convection through bodies according to the method of finite differences, by means of a liquid of a suitable viscosity comprising in combination a frame, a system of resistance control members carried by the frame and interconnected in series, a system of capacity tubes adapted to be filled to a predetermined height with the said liquid, rotatable joints for mounting the capacity tubes for angular adjustment, overflow vessels mounted for vertical displacement on the frame of the model for the purpose of representing a part of the boundary conditions existing at the surfaces of the examined body, bordering with another medium, means for adjusting a predetermined level of liquid in the overflow vessels according to a predetermined temperature program, templates mounted for movement in the model and representing by their operative surfaces the said temperature program and electric pick-up means adapted for cooperation with the said templates to transform the data derived from the templates into operative movements of the model, and a motion control mechanism adapted to transform in a predetermined ratio the data derived from the template into a change of height of the overflow vessel, to allow adjustment of the boundary conditions by means of the electric pick-up means according to the operative edges of the templates, corresponding to the predetermined course temperatures.

9. An electric pick-up for a hydromechanical model of a thermal field provided with means for representing boundary conditions in the examined body comprising in combination a carrying rod adapted for adjustment in a vertical direction, a contact fork mounted for rocking movement in the carrying rod, a pick-up pin provided in the contact fork, springs maintaining the contact fork in its neutral position, a dog engaged by the said springs and cooperating with the contact fork to receive rocking movements of the latter, safety contacts mounted for cooperation with the said dog and adapted to cause quick upward movement of the means representing the boundary conditions upon lateral displacement of the contact fork, a template embodying the predetermined course of temperatures, mounted for displacement in the model and engaged by the said pick-up pin, a carrying fork in engagement with the said contact fork, a contact lever engaged by the said carrying fork, and a system of electric contacts adapted for cooperation with the said contact lever, an electric motor driving the mechanisms of the model, and a relay system actuated by the said contacts and controlling the operation of the electric motor.

10. An electric pick-up as claimed in claim 9, wherein the carrying rod is secured against rotation and is operatively connected with means securing the inoperative conditions of the means controlling the driving electromotor.

11. An electric pick-up as claimed in claim 9, wherein the contacts are resilient and arranged for adjustment.

12. An electric pick-up as claimed in claim 9, wherein the relay system is adapted also for manual control.

13. A hydromechanical model as claimed in claim 1, comprising a driving motor connected in a main electric circuit, the control of the motor being effected by an auxiliary electric circuit consisting of a relay and switch system.

14. A hydromechanical model as claimed in claim 1, comprising a driving motor, means for manual control of the motor and means for automatic control thereof, the means for manual control being separated by switches from the means for automatic control.

15. A hydromechanical model as claimed in claim 1, comprising an electric circuit for the control of the means representing the boundary conditions, a driving motor and means for imparting impulses to the motor according to the predetermined course of operation, the main reversing impulses transmitted to the motor being provided by only two relays, further relays serving for ensuring quick movement and other relays for manual control.

16. An electric pick-up as claimed in claim 9, comprising a relay which becomes operative when jamming of the template occurs, to cause automatic elimination of any movement of the means representing the boundary conditions, with the exception of a quick upward movement.

17. A hydromechanical model as claimed in claim 1, wherein the manual control of the movement of the overflow vessel is possible only by a simultaneous change of the connection of contacts and the required upward and downward movement is achieved by connecting the respective relays, the automatic control being then rendered inoperative.

18. A hydromechanical model as claimed in claim 1, comprising a sparking relay adapted to become operative when a short circuit occurs.

19. A hydromechanical model as claimed in claim 1, comprising a resistance of a predetermined value adapted to become operative when a short circuit occurs.

References Cited in the file of this patent

UNITED STATES PATENTS

| | | |
|---|---|---|
| 2,082,211 | Moore | June 1, 1937 |
| 2,132,514 | Mooney | Oct. 11, 1938 |